June 26, 1962     B. CORNELISON     3,040,887
WAFER THICKNESS DETECTOR
Filed Dec. 23, 1958
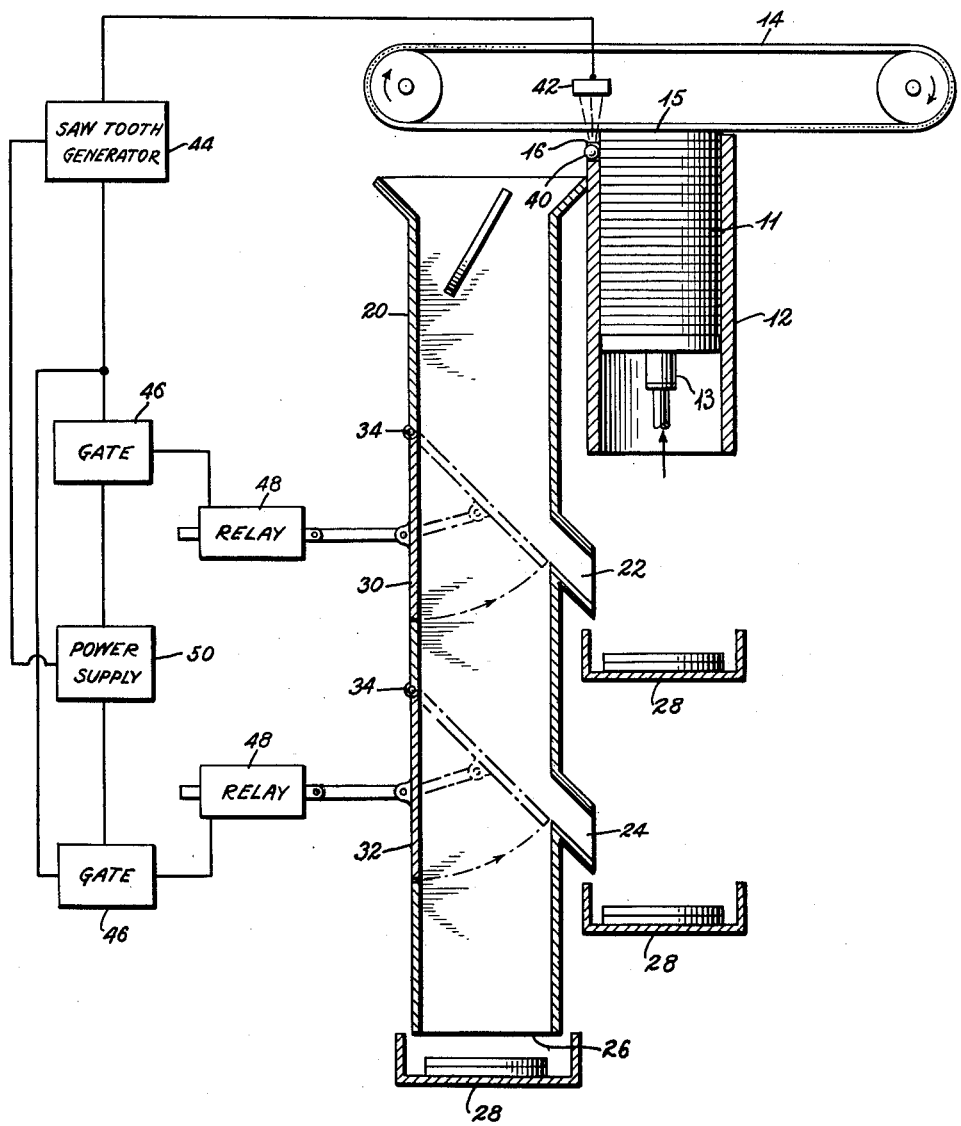
INVENTOR
*Boyd Cornelison*
BY *Stevens, Davis, Miller & Mosher*
ATTORNEYS

United States Patent Office 3,040,887
Patented June 26, 1962

3,040,887
WAFER THICKNESS DETECTOR
Boyd Cornelison, Dallas, Tex., assignor to Texas Instruments Incorporated, Dallas, Tex., a corporation of Delaware
Filed Dec. 23, 1958, Ser. No. 782,472
6 Claims. (Cl. 209—82)

The present invention relates to a measuring device, and has particular reference to a thickness determining apparatus adapted to measure the thickness of wafers or other thin solids and to sort same on a thickness basis.

During production operations with wafers or other thin solids it is often necessary to sort the wafers according to their thicknesses. A simple and accurate method is needed that can operate on wafers of different thicknesses. When a wafer much thinner or much thicker than the average of those included in the group passes through the apparatus of the present invention there will be no loss of accuracy in the measurement made or increase in the time necessary to make such measurement. With the new arrangement no resetting of the machine is necessary to accommodate different thicknesses.

Accordingly, the present invention is directed to a method of measuring the different thicknesses of thin solids which are stacked upon each other and of sorting the solids on a thickness basis.

The invention also seeks to provide a novel device to accomplish this measurement of thickness with ease and accuracy.

Basically, the present invention provides a novel and improved method of measuring the thickness of wafers or other thin solids by forcing stacked wafers out of a cylinder against a transversely moving belt. The wafers are moved normally against the belt at a uniform rate and the time during which a top wafer is in contact with the moving belt before it is wiped off the stack will be a sensible indication of the thickness of the wafer. This information is employed to sort the wafers.

These as well as further advantages which are inherent in the invention will become apparent from the following description, reference being made to the sole figure of the accompanying drawing which portrays in a schematic manner the method of the present invention for making the thickness measurements and sorting and a preferred form of apparatus.

With particular reference now to the FIGURE a basic preferred mechanical embodiment of the features of the present invention is shown in which wafers 11 having different thicknesses are stacked within a vertically oriented cylinder 12. A plunger 13 forces wafers 11 up against a moving belt 14 which is situated at an open top portion of cylinder 12. The moving belt 14 will cause top wafer 15 pressing against it to be wiped off the stack of wafers 11 as soon as it has moved far enough in a direction perpendicular to the surface of moving belt 14 to be able to pass over lip 16 of cylinder 12. The plunger 13 forces wafers 11 to rise in cylinder 12 at a uniform rate. This can be accomplished by any convenient means such as a regulated hydraulic motor or the like. The precise means forms no part of the invention and many such means are known which can provide the desired function.

The measurement for thickness is on a time basis and any convenient means can be employed to determine the time it takes for a wafer to rise sufficiently in the cylinder 12 to be wiped off. Initiating and stopping can likewise be accomplished by any convenient arrangement. Suffice it to say that those skilled in the art would find it obvious to select a timing device and provide controls therefor to measure the time required to elevate a wafer sufficiently to be wiped off.

In order to provide a clearer explanation of the invention there has been included in the FIGURE a means for sorting the wafers on a thickness basis. It will be appreciated that many forms are available to accomplish the sorting function. The specific means shown are merely typical and illustrative and no claim is laid to the specific hardware shown. It is the concept of sorting on a thickness basis responsive to the unique thickness determining means that constitutes the invention.

As shown, a tube 20 receives "wiped off" wafers. The tube 20 possesses discharge spouts 22 and 24 and has an open bottom 26. Trays 28 cooperate with spouts 22 and 24 and open bottom 26 to receive wafers discharging therethrough. Flaps 30 and 32 are pivoted to the wall of tube 20 by hinge means 34 and serve to deflect wafers into spouts 22 and 24, respectively, when pivoted to the positions shown in dotted lines.

The flaps 30 and 32 effect the sorting of the wafers. In order to actuate and control the flaps there are provided a lamp 40 powered from a suitable source, and a cooperating photoelectric cell 42. The output from the cell 42 is connected to a sawtooth generator 44 the output of which is connected to gates 46. Relays 48 are connected to drive flaps 30 and 32 and each is also connected to a gate 46. A suitable supply 50 affords power.

When a wafer is wiped off the top of the stack it interrupts the light from lamp 40. Belt 14 is suitably designed to permit this action. The cell 42 emits a signal responsive to the interruption of light which controls the operation of the generator 44. By means of gates 46 and relays 48, the flaps are serially actuated on a time basis.

Thus if a thick wafer is on top of the stack, a relatively long time will be required to wipe it off and both flaps 30 and 32 will be pivoted. The wafer will pass out through spout 22. If a thinner wafer is on top of the stack, only flap 32 may be actuated, in which case the wafer will pass out through spout 24. If a relatively thin wafer is on top of the stack, neither flap may be actuated, in which event the wafer will pass out the bottom 26 of the tube 20. By the means described sorting is achieved.

It will thus be apparent that one of the most important applications of the present invention is its usefulness in mass production techniques.

It should be understood however that the specific apparatus herein illustrated and described is intended to be representative only, as changes may be made therein without departing from the clear teachings of the invention. Accordingly, reference should be made to the following claims in determining the full scope of the invention.

What is claimed is:

1. A thickness determining device for detecting the thickness of a thin solid comprising a feeding means for moving the thin solid at a uniform rate in a direction perpendicular to and into contact with a moving belt, said moving belt displacing the thin solid from its position in said feeding means in a direction parallel to said moving belt, and timing means for detecting the time interval during which the thin solid remains in contact with said moving belt before being displaced from its position in said feeding means whereby the thickness of the thin solid can be determined by direct proportionality to said interval.

2. A thickness determining device for detecting the thickness of a thin solid comprising a cylinder having a plunger moving at a uniform rate of speed, said plunger pushing a thin solid into contact with a moving belt, said moving belt displacing the thin solid from said cylinder, and a means for detecting the time interval during which the thin solid remains in contact with said moving belt before being displaced from its position in said cylinder whereby the thickness of the thin solid can be determined by direct proportionality to the length of said time interval.

3. A device for detecting the thickness of thin solids and sorting same comprising a feeding means for moving a stack of thin solids at a uniform rate in a direction perpendicular to and into contact with a moving belt, said moving belt displacing the top thin solid from its position in said feeding means in a direction parallel to said moving belt, and means for sorting said thin solids responsive to the time interval during which each thin solid remains in contact with said moving belt before being displaced from the stack.

4. A device for sorting thin solids comprising a cylinder having a plunger moving at a uniform rate of speed, said plunger pushing a stack of thin solids into contact with a moving belt, said moving belt displacing the top thin solid from said cylinder, and means for sorting said thin solids responsive to the time interval during which each thin solid remains in contact with said moving belt before being displaced from the stack.

5. A method of determining the thickness of a solid which comprises the steps of feeding a solid past a stationary point at a uniform rate of speed and perpendicular to a transverse force, utilizing said transverse force to displace the solid in a plane perpendicular to the plane of the thickness dimension of said solid which has passed said stationary point, and timing the interval required to move said solid past said stationary point.

6. A method of sorting solids which comprises the steps of feeding a stack of solids past a stationary point at a uniform rate of speed and perpendicular to a transverse force, utilizing said transverse force to displace into a sorting tube each of the solids in a plane perpendicular to the plane of the thickness dimension of each of said solids which have passed said stationary point, and sorting said solids in the sorting tube according to the interval required to move each said solid past said stationary point.

References Cited in the file of this patent
UNITED STATES PATENTS
2,933,185    Coleman _____ Apr. 19, 1960